March 31, 1964   J. C. TYGART   3,127,069
MEANS FOR ACCURATELY TREATING SOILS IN AGRICULTURAL USE
Filed April 14, 1961   2 Sheets-Sheet 1

INVENTOR
JAMES C. TYGART
BY Shephard & Campbell
ATTORNEYS

March 31, 1964     J. C. TYGART     3,127,069
MEANS FOR ACCURATELY TREATING SOILS IN AGRICULTURAL USE
Filed April 14, 1961     2 Sheets-Sheet 2
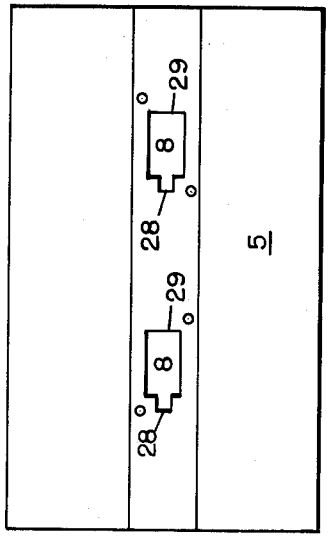
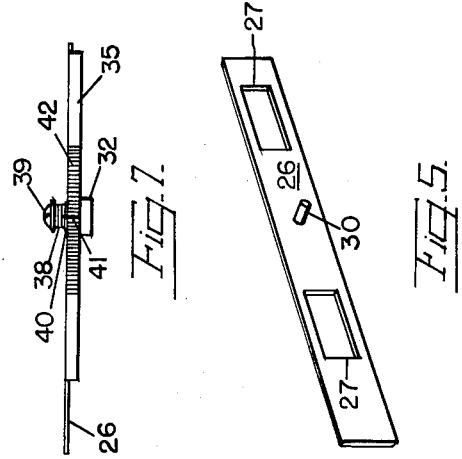
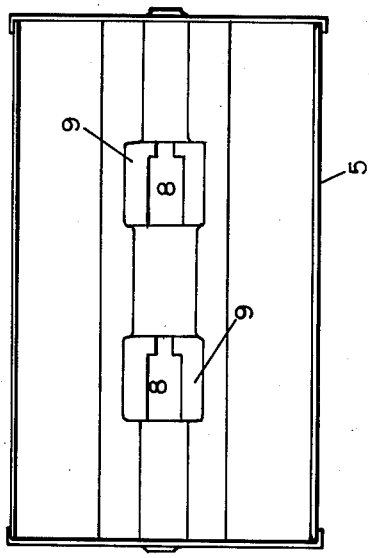
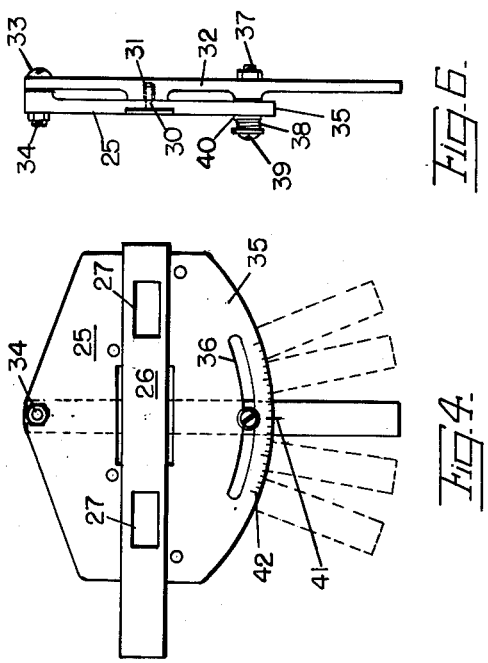
INVENTOR
JAMES C. TYGART
ATTORNEYS

United States Patent Office

3,127,069
Patented Mar. 31, 1964

3,127,069
MEANS FOR ACCURATELY TREATING SOILS IN AGRICULTURAL USE
James C. Tygart, P.O. Box 398, Nashville, Ga.
Filed Apr. 14, 1961, Ser. No. 103,158
5 Claims. (Cl. 222—238)

This invention relates to a method of and means for accurately treating soils in agricultural use. The machine which I have chosen as one specific embodiment of the invention consists of a novel type of supply container or hopper, and a novel type of metering means to control the discharge from the hopper of certain inert carrier materials, said materials, in turn, acting as carriers of any substance which is to be incorporated in the soil being treated. These substances may be insecticides, herbicides, fungicides, weed-killers, fertilizers, or any other substance found desirable for even incorporation in soil employed for the growth of plant life of any nature.

The manner in which the objects of the invention are achieved will be best understood by a consideration of the accompanying drawings, wherein:

FIG. 3 is a plan view of the hopper with metering mechanism removed;

FIG. 4 is a plan view of the removable hopper bottom cover plate, hereinafter described, illustrating a sliding feed plate together with an adjusting handle for said feed plate;

FIG. 5 is a perspective view of the feed plate;

FIG. 6 is a view in elevation looking toward the right-hand end of the structure of FIG. 4;

FIG. 7 is a detail view looking toward the end of the operating handle and the lower edge of the structure of FIG. 4, and FIG. 8 is an underside view of the hopper illustrating the discharge openings therein through which material to be distributed passes to be discharged upon the soil that is being treated.

Like numerals designate corresponding parts in all of the figures of the drawings.

Figure 1:
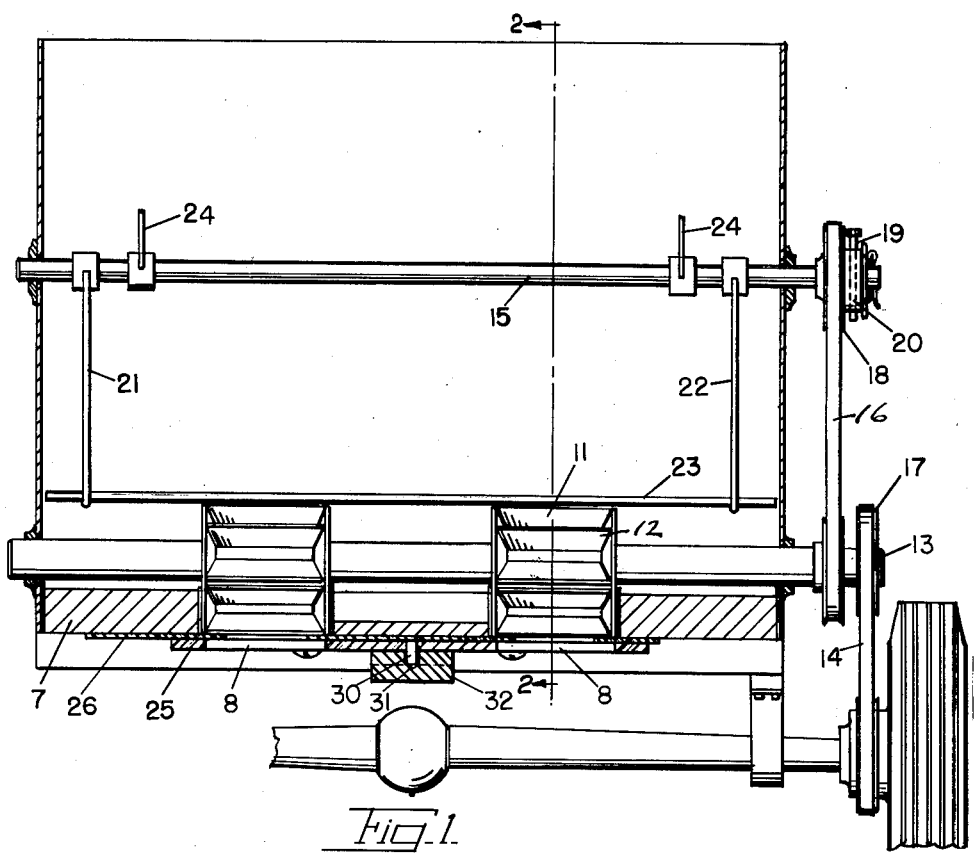
FIGURE 1 is a view in vertical section of the hopper and metering mechanism, looking from the rear side of the device.

The supply and metering machine comprises a hopper 5. The front and rear walls of the hopper are of arcuate formation at 6 and converge toward the bottom of the hopper where a relatively stiff and thick bottom section 7 closes the bottom of the hopper except for the openings 8 formed in the section 7. These openings are located at the bottoms of the wells 9, in which toothed feed wheels or rollers 10 rotate. The tips of the spokes 11 of rollers 10 rotate in close proximity to the walls of the wells 9, and the spaces between the several spokes constitute cells 12, in which the material is carried downwardly to the openings 8.

The wheels 10 are mounted upon a shaft 13 which extends lengthwise through the hopper. This shaft may be driven by a chain or belt, indicated at 14, from any suitable power source, though the invention contemplates that the chain or belt will be driven from one of the ground wheels of a traveling agricultural machine, whether a tractor, planter, fertilizer distributor, insecticide applying machine, or otherwise. When so driven, the movement of the feed wheels 10 will be in synchronism with the rate of travel of the vehicle over the land being treated, so that the distribution of the material being metered will be uniform over the entire land area treated.

An agitator shaft 15 is driven from shaft 13 through a belt or chain indicated at 16 and sprockets or pulleys 17 and 18. The element 18 is secured upon the shaft 15 by a removable pin 19, which pin passes through a hub 20 of the element 18 and through the shaft 15. By removing the pin 19, the element 18 is left to rotate freely upon shaft 15, without turning said shaft. The shaft 15 has rigidly attached thereto a pair of arms 21, 22. At their outer or free ends, these arms carry a rod 23, and this rod constitutes the actual agitating member which sweeps through and agitates the material in the hopper. In their rotation, the arms 21, 22 cause the rod 23 to sweep over the mouths of the cells 12, said rod moving in close proximity to the tips of the spokes 11. Thus, the action of the rod serves to insure that the cells are completely filled with the material to be distributed and that a uniform quantity of said material is delivered by each of said cells to the openings 8.

The arcuate side portions of the hopper at 6 are concentric with shaft 15 (FIG. 2) and thus the rod is caused to sweep down the sides of the hopper to loosen and carry away any of the material which might otherwise adhere to the sides of the hopper. The material thus carried away is carried by the agitator over toward the center of the hopper to be incorporated with the main body of material in the hopper. Further, the downwardly converging sides of the hopper direct the whole body of material toward the center of the hopper and into the cells 12.

The importance of this action will be best appreciated when it is explained that the carrier materials range in coarseness from relatively coarse granules to relatively fine powders. These inert carrier elements are usually made of clay, and the actual treating materials, such as the insecticides or the like, extend over a wide range of materials, these latter materials varying greatly in such respects as to coarseness, gumminess, etc. When some of these materials are added to carrier materials of the nature of dusts, and if they are gummy or hygroscopic to the extent of being normally damp, the resultant mixture of the fine dust with such materials makes them very susceptible to compaction. No machine upon the market, or of which I have knowledge, has been able to meter and distribute evenly and accurately materials tending to compaction, with anything like the degree of success that has been achieved by the machine of the present invention.

While I have illustrated only one pair of arms and one agitator bar 23, the arms 21, 22 may vary in number to any desired degree and carry any desired number of agitating rods 23. To indicate that such is the case, I have indicated at 24, in FIGS. 1 and 2, additional arms which perform the same function as the arms 21 and 22.

Since distinctly granular carrier materials flow more readily toward the discharge openings 8 than do the powdery materials of a compacting nature, I provide means by which a smaller opening is presented for the escape of the granular materials than is presented for the escape of the powdery and possibly somewhat gummy dust-like carriers. To this end, the bottom of the hopper is made to consist of a plate 25, the upper face of which is recessed for the reception of the sliding feed plate 26 (FIG. 5). This feed plate is provided with two feed openings 27. This feed plate slides lengthwise of and in close contact with the lower face of the section 7 through which the openings 8 are formed, as is best illustrated in FIG. 8. The openings 8 are shaped to provide narrow portions 28 and portions much larger in area at 29, the material passing through the portions 28 when granular material is being fed, and said material passing through the larger portions 29 when the compacting, powdery materials are being fed, it being understood that the slide plate is moved to bring its openings 27 into the proper position to accomplish the foregoing object. The presence of the feed wheels or rollers 10 prevents too free flowing of granular material from the hopper. In some device of this nature it has been found that some free flowing particles of a granular nature will run out of the hopper in a fast stream unless prevented or controlled. The stopping of the agitator, by removing pin 19, and the presence of the feed wheels enables me to get a desirable control over the feeding action of these free flowing materials.

To effect accurate adjustment of the slide 26 to the desired position, said slide is provided with a pin 30. This pin enages in a slot 31 of an adjusting handle 32. This handle is pivoted at 33 upon a bolt 34 that is carried by bottom plate 25. A portion 35 of the bottom plate projects beyond the hopper to a desired extent and has an arcuate slot 36 formed therethrough, which slot is concentric with the pivot point 33 of the adjusting handle. A bolt having a threaded end 37 is carried by the adjusting handle 32 and extends through the arcuate slot. A spring 38 bears between the head 39 of the bolt and a washer 40 to provide a friction stop to hold the handle 32 in its adjusted position over any desired length of time.

As far as I am aware, I am the first to provide a dual-purpose machine of the character herein described, wherein the machine is adapted to feed either free flowing coarse granules or dust-like carriers through one and the same mechanism by mere adjustment of the handle as described, it being understood that the granules cannot be fed en masse through the larger area feed openings, because such action tends to break them up and because they tend to flow too fast therethrough; while the dust-like carriers, if impregnated with sticky or hydroscopic materials, tend to compact.

Figure 2:
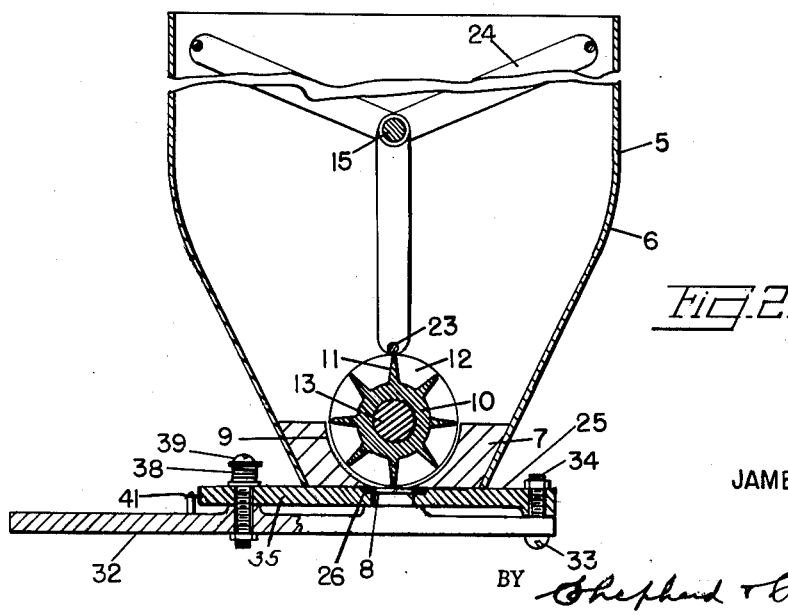
FIG. 2 is a vertical sectional view upon line 2—2 of FIG. 1.

I wish to point out that the location of the cell-carrying feed rollers or wheels 10 is such with respect to the discharge or feed openings that the non granular material is practically wiped through these openings. This is especially important where the materials are so adherent that they will not readily fall through the openings by their own volition but would gum up and would not feed. Thus, the conjunction of the agitator, the feed roller with its cells, and the discharge openings must be such that they feed at a very close degree to feed the material therethrough. As illustrated in FIG. 2, the tips of the spokes travel over the upper face of the feed plate 26 of FIG. 5 and in close contact therewith. It is this relationship which permits the tips of the spokes to wipe sticky, adherent materials downwardly through the large openings of the feed plate so that such materials may fall upon the ground. After the material in any cell 12 has passed below the top of the thick bottom section of the hopper such material is trapped in such cell and cannot escape until it travels to an opening of the feed plate, to be wiped through such opening, as described.

While openings of the character illustrated have been found to be very satisfactory in giving the desired result, I wish it to be understood that the invention is not limited to openings of this particular shape, either in the slide or in the hopper bottom 7, but that the shape of these openings may be varied in any way in order to give the desired results. Furthermore, the openings in both hopper bottom and slide may be varied in number to any desired extent. Thus, a known quantity of openings for any desired feed application rate, with a known feed roller speed in a determined ratio to movement of the structure over the ground, will enable one to determine which setting of the handle should be resorted to in order to apply a given amount of the material over a given area of land.

The portion of plate 25 which carries the arcuate slot 36 may be graduated to indicate the point at which the handle should be set. In addition, it may be stated that instead of, or in addition to, the frictional detent 40, the handle may carry a yieldable leaf spring 41 to click over fine serrations 42 formed in the edge of plate 25, whereby to further aid in holding the handle in adjusted position.

It should be understood that this device, while capable of metering and of feeding both granular and fine compacted material does not handle these materials simultaneously. When coarse granular materials, capable of falling of their own weight through the smaller portions 28 of the feed slots, are being handled, an agitator may not be required, in which case the pin 19 may be removed to permit the shaft 13 to continue its rotation while permitting the agitator shaft 15 to remain at rest. At this time the feed plate covers all of the openings 8 except the portions 28 (FIG. 8).

It is to be understood that the invention is not limited to the particular constructions shown but that it includes within its purview whatever changes fairly fall within either the terms or the spirit of the appended claims.

I claim:

1. A machine for dispensing either granular, free-flowing ground treating material or gummy compacting, ground-treating materials, said machine comprising a hopper for the reception of one or the other of such materials, said hopper having a relatively thick bottom, rotating feed wheels, wells formed in the hopper bottom and having arcuate walls within which wells said feed wheels are disposed for rotation in vertical planes, said feed wheels comprising a plurality of radial spokes, the spaces between which constitute cells within which the material to be dispensed is received from the hopper and carried to the bottoms of the wells, the tips of the spokes traveling in close proximity to the arcuate walls of said wells, said wells having openings formed through their bottoms, a movable feed plate disposed below the bottom of the hopper which feed plate has openings therethrough which are shaped to connect with the openings in the bottoms of the wells to determine the area of the outlet presented for the passage of the dispensed material from said wells, a fixed support by which the feed plate is supported for movement in such close relation to the bottoms of the wells that the tips of the spokes move in such close relation to and over the bottom surfaces of the wells and over the upper surface of said feed plate as to wipe gummy materials delivered from said cells from these surfaces and push it, through the feed plate.

2. A structure as recited in claim 1 in combination with an agitator mounted for rotation within the hopper and comprising a rod which passes in close relation to the tips of the spokes of the feed wheels to aid in compacting the material in the cells between said spokes, said hopper comprising downwardly converging side walls which cause the material being dispensed to move toward the center of the hopper above the feed wheels.

3. A structure as recited in claim 1 wherein said wells are of such depth with respect to the diameter of the feed wheels that the cells are closed by the walls of the wells throughout the lower half of the revolution of the feed wheels.

4. A structure as recited in claim 1 wherein the openings in the bottoms of the wells and the openings through the feed plate are of such shape and relation that movement of the feed plate presents an escape opening of relatively large area when sticky or compacting materials are being dispensed or escape openings of much smaller area when granular, non-sticky materials are being dispensed.

5. A structure as recited in claim 1 in combination with a shaft by which the feed wheels are carried, a rotating agitator shaft disposed within the hopper, agitating means carried by the agitator shaft comprising spaced arms connected to the agitator shaft and a rod carried by the outer ends of said arms which rod sweeps over the tips of the spokes to aid in filling the cells between said spokes, a common driving means for the shaft of the feed wheels and the shaft of the agitator and means for disconnecting the agitator shaft from the driving means to permit continuing action of the feed wheels while interrupting agitation of the material in the hopper.

References Cited in the file of this patent

UNITED STATES PATENTS

| | | |
|---|---|---|
| 532,603 | Snavely | Jan. 15, 1895 |
| 639,754 | Morgan | Dec. 26, 1899 |
| 1,008,200 | Sanders | Nov. 7, 1911 |
| 1,573,493 | Heyd | Feb. 16, 1926 |
| 2,200,773 | Von S. Finne | May 14, 1940 |
| 2,248,700 | Finnell | July 8, 1941 |
| 2,394,781 | Jeffords | Feb. 12, 1946 |
| 2,541,867 | Givenrod | Feb. 13, 1951 |
| 2,633,272 | Moore et al. | Mar. 31, 1953 |
| 2,768,773 | Bjerre | Oct. 30, 1956 |
| 2,778,535 | Seltzer | Jan. 22, 1957 |
| 2,851,200 | De Foa | Sept. 9, 1958 |

FOREIGN PATENTS

| | | |
|---|---|---|
| 216,434 | Australia | Apr. 3, 1958 |